United States Patent
Gangadharan et al.

(10) Patent No.: US 9,672,011 B2
(45) Date of Patent: Jun. 6, 2017

(54) SYSTEM AND METHOD FOR COMPOSING A TELECOMMUNICATION APPLICATION BY ORCHESTRATING APPLICATION COMPONENTS

(71) Applicant: ORACLE INTERNATIONAL CORPORATION, Redwood Shores, CA (US)

(72) Inventors: Binod Pankajakshy Gangadharan, Bangalore (IN); Chao Bo Wang, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 643 days.

(21) Appl. No.: 13/671,416

(22) Filed: Nov. 7, 2012

(65) Prior Publication Data

US 2014/0130009 A1    May 8, 2014

(51) Int. Cl.
  *G06F 9/44*    (2006.01)
(52) U.S. Cl.
  CPC .................................. *G06F 8/315* (2013.01)
(58) Field of Classification Search
  CPC ................ G06F 8/20; G06F 8/71; G06F 8/36
  USPC ........................................................ 717/107
  See application file for complete search history.

(56) References Cited

U.S. PATENT DOCUMENTS

| | | | |
|---|---|---|---|
| 6,760,417 B1 | 7/2004 | Wallenius | |
| 7,136,913 B2 | 11/2006 | Linderman | |
| 7,398,530 B1 * | 7/2008 | Parla et al. | 719/318 |
| 7,483,438 B2 | 1/2009 | Serghi et al. | |
| 8,296,409 B2 | 10/2012 | Banerjee et al. | |
| 2002/0025795 A1 | 2/2002 | Sharon et al. | |
| 2003/0028790 A1 | 2/2003 | Bleumer et al. | |
| 2004/0009762 A1 | 1/2004 | Bugiu et al. | |
| 2005/0245230 A1 | 11/2005 | Benco et al. | |
| 2005/0262499 A1 * | 11/2005 | Read | G06F 8/67 717/172 |
| 2007/0106801 A1 | 5/2007 | Jansson | |
| 2007/0143470 A1 | 6/2007 | Sylvain | |
| 2007/0192465 A1 * | 8/2007 | Modarressi | H04L 67/10 709/223 |

(Continued)

OTHER PUBLICATIONS

Ramesh Parthasarathy et al., Converged Application Framework for Creating Web 2.0—IMS Mashups, which is published in Internet Multimedia Services Architecture and Applications (IMSAA), 2009 IEEE International Conference on Dec. 9-11, 2009.*

(Continued)

*Primary Examiner* — Li B Zhen
*Assistant Examiner* — Daniel Wei
(74) *Attorney, Agent, or Firm* — Tucker Ellis LLP (57) ABSTRACT

In accordance with various embodiments, systems and methods are provided which facilitate composing a telecommunication application by orchestrating application components. Embodiments of the invention enhance the use of simplified programming constructs for user activities in a telecommunications network providing an invocation manager which invokes event functions in an order identified by an orchestrator. The orchestrator holds all specified event functions each with trigger chance and priority value. The event functions can be defined in Communication Beans with annotations and may be updated and selected by an XML file.

20 Claims, 3 Drawing Sheets

(56) References Cited

U.S. PATENT DOCUMENTS

| | | | |
|---|---|---|---|
| 2008/0037747 A1* | 2/2008 | Tucker | H04L 65/1096 379/201.12 |
| 2008/0103923 A1 | 5/2008 | Rieck et al. | |
| 2009/0070786 A1* | 3/2009 | Alves et al. | 719/318 |
| 2009/0172134 A1* | 7/2009 | Sterling | G06Q 10/06 709/220 |
| 2009/0268715 A1 | 10/2009 | Jansson | |
| 2011/0082920 A1 | 4/2011 | Bhattacharya et al. | |
| 2012/0284725 A1* | 11/2012 | Zwaal | 718/102 |

OTHER PUBLICATIONS

Ramesh Parthasarathy et al, Converged Application Framework for Creating Web 2.0—IMS Mashups, published in Internet Multimedia Services Architecture and Applications (IMSAA), 2009 IEEE International Conference on Dec. 9-11, 2009.*
BEA, WebLogic Network Gatekeeper, Architectural Overview, Version 3.0, 112 pages, Sep. 2007.
Chen et al., Applying SOA and Web 2.0 to Telecom: Legacy and IMS Next-Generation Architectures, IEEE, 6 pages, 2008.
Oracle Communication Services Gatekeeper Concepts and Architectural Overview, Release 4.1, Oracle, 94 pages, Jan. 2009.

* cited by examiner

Figure 1

PRIOR ART

SYSTEM AND METHOD FOR COMPOSING A TELECOMMUNICATION APPLICATION BY ORCHESTRATING APPLICATION COMPONENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to a system and method for composing a telecommunication application by orchestrating application components.

BACKGROUND

With the explosive proliferation of IP-enabled mobile and fixed devices capable of offering Web, telecommunications and entertainment services, such as 3G/4G-enabled smartphones, TVs, home appliances, gaming consoles, and automobiles, among others, operators of mobile, broadband and fixed networks are faced with the operational and business challenges of delivering innovative IP-based communication services with maximum profitability. In order to achieve this goal, customers are increasingly migrating away from expensive, closed, proprietary and application-specific legacy platforms, and towards low-cost, open, standards-based unified converged application platforms, which dramatically lowers the time and cost of adding new features and extensions to existing IP-based communication services.

Session Initiation Protocol (SIP) is a control (signaling) protocol developed to manage interactive multimedia IP sessions including IP telephony, presence, and instant messaging. SIP Servlet provides a standard Java API programming model for delivering SIP-based services. SIP Servlet APIs expose the full capabilities of the SIP protocol in a Java and Java EE middleware solution. The SIP Servlet APIs also enable multiple applications to execute on the same request or response, independently of one another. Thus application developers can write applications providing features that are independent of each other, but can be deployed to the same host SIP Servlet container. SIP Servlet APIs thereby provide a programming model that is as well suited to meet the needs of the application developer and the operational requirements of the service provider.

There are many use cases in which a converged application operating on multiple services/protocols is desirable. A converged application using both SIP and HTTP functions can be used, for example, for: conferencing; click-to-call applications; Presence; and User Agent Configuration Management applications. A converged telecommunication application framework is a framework designed to abstract complexities for SIP Servlets to provide a set of easily usable artifacts which enable easy creation of programs. The SIP Servlet API is closely aligned with the Java EE specifications and containers that host SIP Servlet applications can also make Java EE features such as a HTTP Servlet container available to developers. Converged applications can also combine other protocols such as Diameter to perform advanced functions such as modifying subscriber profile data. A converged application server can, thus, deliver a converged application container, offering integrated support for Java EE, SIP, Web Services, and IMS standards.

SUMMARY

Oracle Communications Converged Application Server (OCCAS) provides a carrier-grade, open, standards-based converged Web-telecom application platform based on the SIP Servlet, Java EE, Web Services, and IMS standards. It is designed for a wide-range of IP-based, communication-enabled applications, such as VoIP, multimedia conferencing, SIP/IMS-based call control and messaging services. OCCAS includes a converged telecommunication application framework designed to abstract the complexities of SIP Servlets and provide a set of easily usable artifacts which enable easy creation of programs without detailed knowledge of the underlying SIP level protocol and events. OCCAS provides what are called "Communication Beans" which provide event functions. The event functions of Communication Beans handle the SIP protocol (and many other industry specifications from OMA, 3GPP and IETF) event. The developer can write logic to modify the behavior of the event functions. This is done from the perspective of modifying the behavior of "communication" it is handling rather than modifying the SIP protocol actions.

However, ahead of this invention, if multiple application components, such as SIP Servlets, which are interested in the same event (such as triggered by incoming SIP message), the converged application framework sequentially forwards the event to applications which these components belong to one by one. The developer is thus unable to orchestrate activity of these components without preparing multiple applications, and SIP protocol level application router code to handle the orchestration of the applications. Managing multiple applications is cost intensive both from an administration perspective and also from a runtime perspective. When there are multiple applications, there are effectively multiple SIP runtime environments managed by the container. Hence the messages that need to traverse multiple applications will have to incur all the costs of a SIP stack like transaction layer, dialog layer, etc.

In accordance with embodiments of the invention, the converged application framework of a converged application server is extended to facilitate the creation and deployment of converged applications. The current invention enhances the use of simplified programming constructs for user activities in a telecommunications network. Embodiments of the present invention allow composition of event function components into a single application. Particular embodiments of the invention, provided a developer with the ability to write multiple Communication Beans in a single SIP/Converged application, each Communication Bean containing one or multiple event functions, each event function for handling specified event ( event functions in different Communication Beans can be for same event). Communication Beans provide for logic organization, classification and management of event functions. Thus, embodiments of the invention reduce the need to create and multiple applications and the need for preparing custom application router code at the protocol level to handle the orchestration of the applications. Furthermore, embodiments of the invention reduce runtime complexity by reducing the number of SIP runtime environments managed by a container and reducing or eliminating the overhead incurred by messages that traverse multiple applications such as an SIP stack like transaction layer, dialog layer, etc.

In accordance with embodiments of the invention the converged application framework of a converged application server is extended by providing a system and method for composing a telecommunication application by composing and orchestrating event function components in a single application container. The framework allows a developer to compose an application by effectively routing the events to separate event function components for processing events using an orchestration system. In embodiments of the invention a simple annotation (and/or an XML file) can be used to specify the event function component that will handle the event and, thereby, orchestrate execution of components of the application.

In accordance with various embodiments, systems and methods are provided which facilitate composing a telecommunication application by orchestrating application components. Embodiments of the invention enhance the use of simplified programming constructs for user activities in a telecommunications network providing an invocation manager which invokes event functions in an order identified by an orchestrator. The orchestrator holds all specified event functions definition each with trigger chance and priority value. The event functions can be defined by annotations in Communication Beans and may be updated and selected by an XML file.

In accordance with a particular embodiment, the invention provides a system for controlling invocation of event functions in a Communication Bean in response to an event, wherein the system includes a plurality of event functions which operate on an event; an orchestrator which identifies a sequence in which to invoke said plurality of event functions; and an invocation manager operating on one or more microprocessor, wherein, in response to occurrence of said event, the invocation manager repeatedly calls the orchestrator to identify an event function to invoke, and sequentially invokes the event functions identified by the orchestrator, thereby invoking each of the plurality of event functions subscribed to the event in the sequence identified by the orchestrator. The system allows for selectable integration of a plurality of event functions into a Communication Bean application with control over the priority and trigger chance for invoking the event functions within the application. Here the Communication Bean application refers to a SIP/converged application incorporating the features of the present invention. The system allows developers to flexibly assemble event functions into Communication Beans according to elastic criteria. The criteria include, for example, Call Barring related event functions which may be defined in the same Communication Bean; Call or Conference related event functions which are usually defined in different Communication Beans; event functions for general JSR309 media control which may be provided by same Communication Bean, and so on. The system enables developers to determine criteria for organizing event functions by themselves. An event function with a specified trigger chance and specified priority value would have same invocation effect no matter whether it is from Communication Bean-A or Communication Bean-B. Here trigger chance includes two aspects, the first and the key one is the event which is interested or subscribed by the event function, another is some additional trigger criteria described in 0024.

Other objects and advantages of the present invention will become apparent to those skilled in the art from the following detailed description of the various embodiments, when read in light of the accompanying drawings.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears. Likewise the first two digits in a four digit reference numeral.

Figure 1:
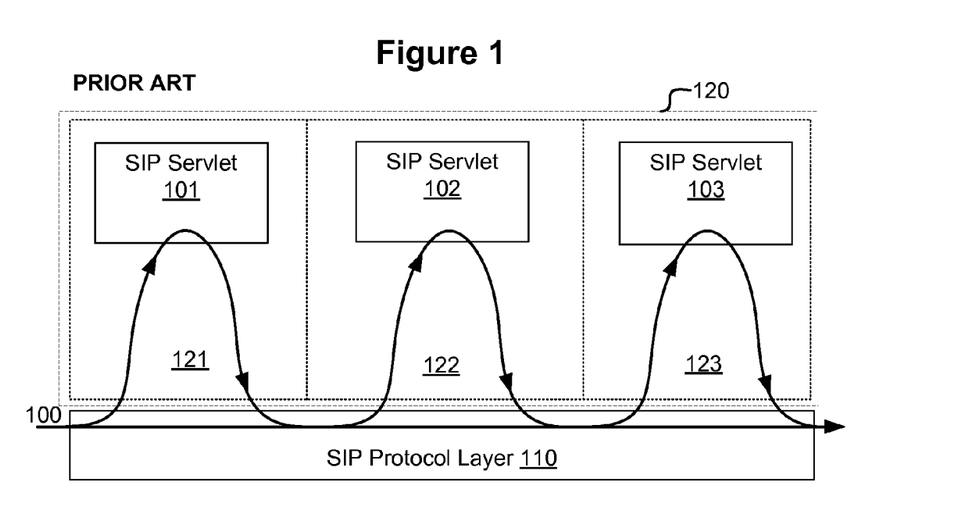
FIG. 1 shows event handling in a prior art converged application server.

FIG. 1 shows event handling in a prior art converged application server. FIG. 1 illustrates an event 100 in the SIP Protocol Layer 110. As shown in FIG. 1, three SIP Servlets 101, 102, 103 are interested in the same event 100 occurring in the SIP Protocol Layer 110. The converged application framework 120 sequentially forwards the event 100 to the SIP Servlets 101, 102, 103, one by one. The developer is thus unable to orchestrate activity of the SIP Servlets 101, 102, 103 without preparing multiple applications and SIP protocol level application router code to handle the orchestration of the applications. Moreover, each of SIP Servlets 101, 102, 103 operates in a separate application container instance 121, 122, 123. Thus, information/messages passed between SIP Servlets 101, 102, 103 occur in the SIP Protocol Layer 110, and incur all the costs of a SIP stack, e.g. transaction layer, dialog layer, etc.

In accordance with embodiments of the invention the converged application framework of a converged application server (for example OCCAS) is extended by providing a system and method for composing a telecommunication application by composing and orchestrating components in a single application container. The enhanced converged application framework allows a developer to compose an application by effectively routing the events to separate application components known as event functions using an orchestration system. In embodiments of the invention, simple annotation can be used to define trigger chance (event subscribed by event function plus some optional criteria) and priority for event function so as to let orchestrator can select the event functions that will handle the event and, thereby, orchestrate sequential execution of event functions of application.

Figure 2:
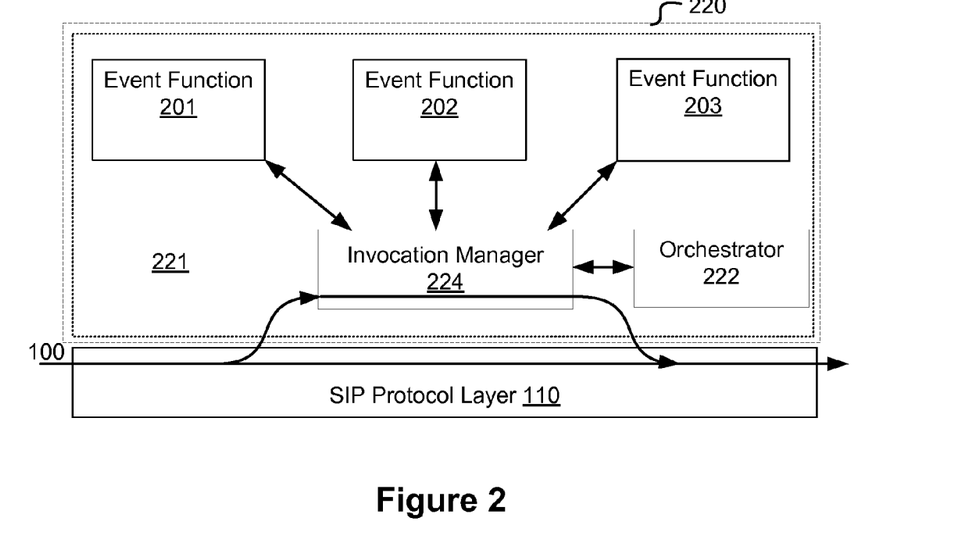
FIG. 2 shows event handing in a converged application server according to an embodiment of the present invention.

FIG. 2 shows event handling in an enhanced converged application server having an enhanced converged application framework 220 according to an embodiment of the present invention. As shown in FIG. 2, three event functions 201, 202, 203 are interested in the same event 100 occurring in the SIP Protocol Layer 110. In this case, event 100 is routed through an invocation manager 224. Invocation manager 224 utilizes orchestrator 222 to determine which of event functions 201, 202, 203 to invoke and in what order. Invocation manager 224 consults orchestrator 222 and invokes/calls the selected event functions 201, 202, 203 in the order specified by the orchestrator 222.

The application framework 220 may supports filtering event functions by additional criteria at runtime. Only certain event functions meeting the specified criteria are handed to the orchestrator to take effect when the event occurs. Event functions not meeting the specified criteria are eliminated and therefore not performed in response to the event although they subscribed the event. Certain event functions can be selected or deselected based upon the call context or other rules, for example, time of day, type of caller, type of user equipment etc. Such kind of filtering can be implemented by annotation scanning and matching. However, for the convenience of simplicity, in the subsequent description, when we say trigger chance of event functions, we will ignore the additional criteria said here, and assume the trigger chance only refers to event which the event function subscribed.

In accordance with a particular embodiment of the invention, the converged application framework 220 provides for controlling invocation of event functions 201, 202, 203 in response to an event 100, wherein the system includes a plurality of selected event functions 201, 202, 203 subscribed to an event 100; an orchestrator 222 which identifies a sequence in which to invoke said plurality of event functions 201, 202, 203; and an invocation manager 224 operating on one or more microprocessor, wherein, in response to occurrence of said event, the invocation manager 224 repeatedly calls the orchestrator 222 to identify which of event functions 202, 202, or 203 to invoke, and sequentially invokes the event function 201, 202, or 203 identified by the orchestrator 222, thereby invoking each of the plurality of event function 201, 202, 203 subscribed to the event 100 in the sequence identified by the orchestrator 222.

The developer is thus able to orchestrate activity of the event functions 201, 202, 203 using the orchestrator 222 and without preparing multiple applications and SIP protocol level application router code to handle the orchestration of the applications. This reduces administration complexity and overhead. Moreover, each of event functions 201, 202, 203 is invoked in the same application container instance 221 thereby reducing runtime complexity. Thus, information/messages passed between event functions 201, 202, 203 occur within the application framework 220 and thus avoid the costs of a SIP stack, e.g. transaction layer, dialog layer, etc. The ability to compose components into a single application reduces complexity and makes the composition, effectively, a simple method call.

Orchestrator 222 can be a pre-built XML-based orchestrator, an annotation-based orchestrator, and a custom orchestrator. Each type of orchestrator allows the developer to customize the invocation sequence. With respect to the annotation-based orchestrator, the application framework provides an annotation named "EventOrchestration" (see Example 1, below). The annotation definition allows a Communication Bean to define a priority value for handling an event. The priority value is a non-negative integer no greater than 100. Lower values represent higher (earlier) priority. The priority value is used to determine the order to deliver event to the event functions. That is to say that an event function with a smaller priority value will be triggered prior to an event function with a bigger priority value. The default priority value is set to 100.

EXAMPLE 1

@Target ({ ElementType.METHOD })
@Retention (retentionPolicy.RUNTIME)
public @interface EVENTOrchestration {
/ **
* The priority to handle the event.
* This filed is used to determine the order to deliver event to the event functions in Communication Beans.
* Small value means higher priority.
* Or say event function with smaller priority value will be triggered prior to function with bigger value.
* The default value is 100.
@return
*/
int priority( ) default 100;
}

The EventOrchestration annotation is used in conjunction with the event annotation to identify the priority to receive the event. In Example 2 and Example 3 below, an event function in the form of a Communication Bean "Test 1" is defined having an Event Orchestration annotation which includes the priority value of 1; and an event function in the form of a Communication Bean "Test 2" is defined having an Event Orchestration annotation which includes the priority value of 2. Both the "Test 1" and "Test 2" Communication Beans subscribe for the same event. (ParticipantEvent.Type.JOINING indicates the first message from calling party or called party is received, to a conversation/call, it throws when framework receives INVITE from calling party or 180 response from called party to inform Communication Bean application that calling party or called party is joining in the call), Thus when the event is detected the orchestration specifies that the event is first handled by ""Test 1" (priority value=1) and then by "Test 2" (priority value=2).

EXAMPLE 2

@CommunicationBean
Public class Test1 {
@Context
    CommunicationContext<?, UserParticipant,?> ctx;
    @EventOrchestration( priority=1 )
    @ParticipantEvent(type= ParticipantEvent.Type.JOINING,
    communicationType = Conversation.class)
    Public void handleStatedEvent( ) {
    System.out.println(">>>>>>>>>>>>>>>>>> Test 1 is called");
    }
}

EXAMPLE 3

```
@CommunicationBean
Public class Test2 {
@Context
    CommunicationContext<?, UserParticipant,?> ctx;
    @EventOrchestration( priority=2 )
    @ParticipantEvent(type= ParticipantEvent.Type.JOINING,
    communicationType = Conversation.class)
    Public void handleStatedEvent( ) {
    System.out.println(">>>>>>>>>>>>>>>>>> Test 2 is called");
    }
}
```

Application framework also provides another orchestrator named XML-based orchestrator. By reading a sft.xml file, XML-based orchestrator can specify which communication bean and event functions will be applied by application framework, it can apply all event functions or only apply part of event functions which originally defined in Communication Beans; sft.xml can also specify new priority values for one or more event functions to overwrite original priority values defined by annotation, thus to adjust their invocation order when handling an event. In our application framework, XML-based orchestrator is actually an enhanced annotation-based orchestrator. As before, the priority value is a non-negative integer no greater than 100 with lower values representing higher (earlier) priority. An event function with a smaller priority value identified in the XML file will be triggered prior to an event function with a bigger priority value. An example of a suitable sft.xml file is provided in Example 3, below.

EXAMPLE 4

```
<?xml version="1.0" encoding="UTF-8"?>
<sft-app xmlns:xsi="http://www.w3.org/2001/XMLSchema-instance"
    xsi:schemaLocation="http://ww.oracle.com/sdp/sft sft.xsd"
    xmlns=" http://ww.oracle.com/sdp/sft">
    <communication-bean>
        <class-name>com.oracle.sft.test.Test1</class-name>
        <event communication-type="Conversation" event-
        type="ParticipantEvent.Type.JOINING">
            <orchestration priority="2" />
        </event>
</communication-bean>
    <communication-bean>
        <class-name>com.oracle.sft.test.Test2</class-name>
        <event communication-type="Conversation" event-
        type="ParticipantEvent.Type.JOINING">
            <orchestration priority="1" />
        </event>
</communication-bean>
<annotation-scanning load-strategy="INCLUDE">
        <packages/>
</ annotation-scanning>
```

In Example 4, above, there are two event functions in the form of Communication Beans named "Test1" and "Test2" which are both interested in the same event—"ParticipantEvent.Type.JOINING". When the event occurs it will be routed first to Test2 (priority=1) and then to Test1 (priority=2) according the priority specified in the sft.xml file.

As mentioned, if XML-based orchestrator is used, developer can load and apply all event functions or part of event functions originally defined in Communication Beans. Or say this invention support filtering event functions when load them into orchestrator. An attribute named load-strategy is introduced for <annotation-scanning>. load-strategy supports three values ALL, INCLUDE or EXCLUDE for loading and applying all event functions or only applying event functions specified in sft.xml or only exclude event functions specified in sft.xml. More concretely, If load-strategy is ALL, then all event functions defined in Communication Bean will be load and applied, and all <communication-bean> in sft.xml will be ignored; If load-strategy is INCLUDE, then only event functions specified within <communication-bean> will be loaded and applied, to a Communication Bean, if it is not specified in sft.xml, in other word, if there is no <communication-bean> in sft.xml matches the Bean, then all event functions defined in this bean will be ignored, if a Communication Bean is specified in sft.xml, then only its event functions specified by <event> sub tags (event sub tag represents and matches trigger chance of event function) will be applied, and priority values of these event function will be overwritten by priority values of <orchestration>; If load-strategy is EXCLUDE, then all event functions not present in sft.xml will be loaded and applied, in this case, if a Communication Bean is not specified in sft.xml, then all its event functions will be applied; if a Communication Bean is specified in sft.xml, then only event functions not specified by <event> tags of corresponding <communication-bean> will be applied, in these case, no priority overwriting will be performed. Before performing certain load-strategy, annotation-scanning mechanism can also first filter Communication Beans by specified package paths. For example, if <packages> <package>com.oracle.sft.conversation</package> <package>com.oracle.sft.conference</package> <packages> is defined under <annotation-scanning>, then only Communication Beans which leading package paths match specified two package paths have chance to be as candidate for performing certain load-strategy to be determined which Communication Beans with their event functions will be applied finally. We can see in Example 4, no packages' filtering is used. Developers can adjust or rewrite strategy and rules by providing customized orchestrators.

Figure 3A:
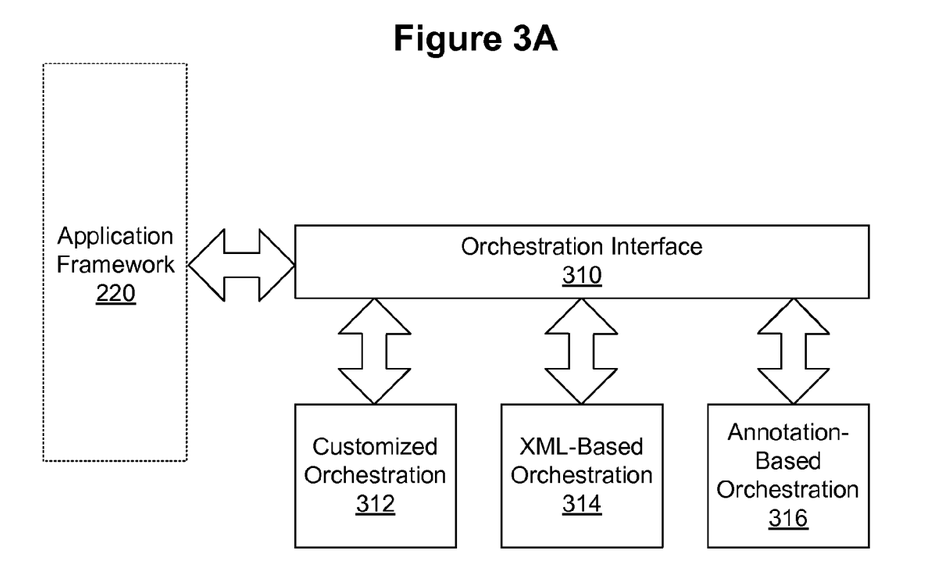
FIG. 3A shows an orchestration interface for providing orchestration plug-ins to a converged application server according to an embodiment of the present invention.

FIG. 3A shows an orchestration interface for providing orchestration plug-ins to a converged application server according to an embodiment of the present invention. As shown in FIG. 3A, an orchestration interface 310 utilizes a plurality of plug-ins 312, 314, 316, to provide orchestration capability to application framework 220. Orchestration interface 310 can load customized orchestration plug-in 312, XML-based orchestration plug-in 314 and annotation-based orchestration plug-in 316 to augment the functionality of application framework 220.

Figure 3B:
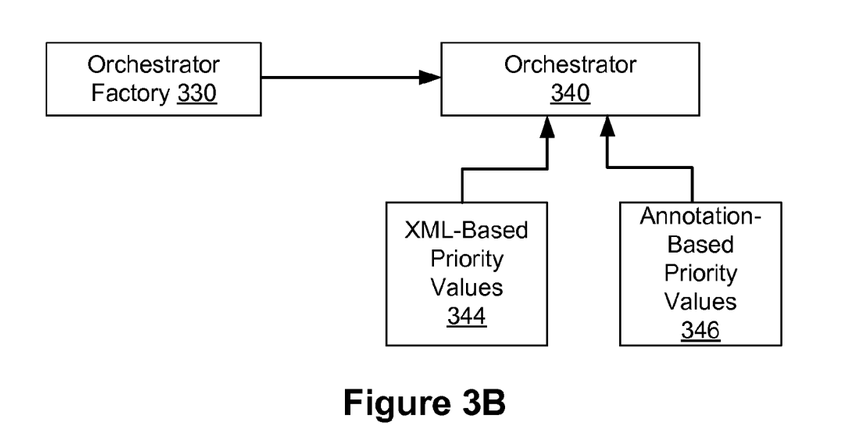
FIG. 3B shows an orchestrator factory for pre-building an orchestrator according to an embodiment of the present invention.

FIG. 3B shows an orchestrator factory for pre-building an orchestrator according to an embodiment of the present invention. As shown in FIG. 3B, when the application framework starts, an Orchestrator Factory 330 is initialized. In an embodiment of the invention, the Orchestrator Factory 330 decides to load a pre-build orchestrator 340. To do this, Orchestrator Factory 330 first looks up the sft.xml file in an application. If the sft.xml file is not present, the Orchestrator Factory uses the annotation-based priority values 346 to build the orchestrator 340. To load the annotation-based priority values 346, an annotation processor is used to scan annotations in the Communication Beans of an application and read the annotation-based priority values 346. If the sft.xml file exists, the XML-based priority values 344 in sft.xml will overwrite annotation-based priority values and are used to build the orchestrator 340.

Figure 4:
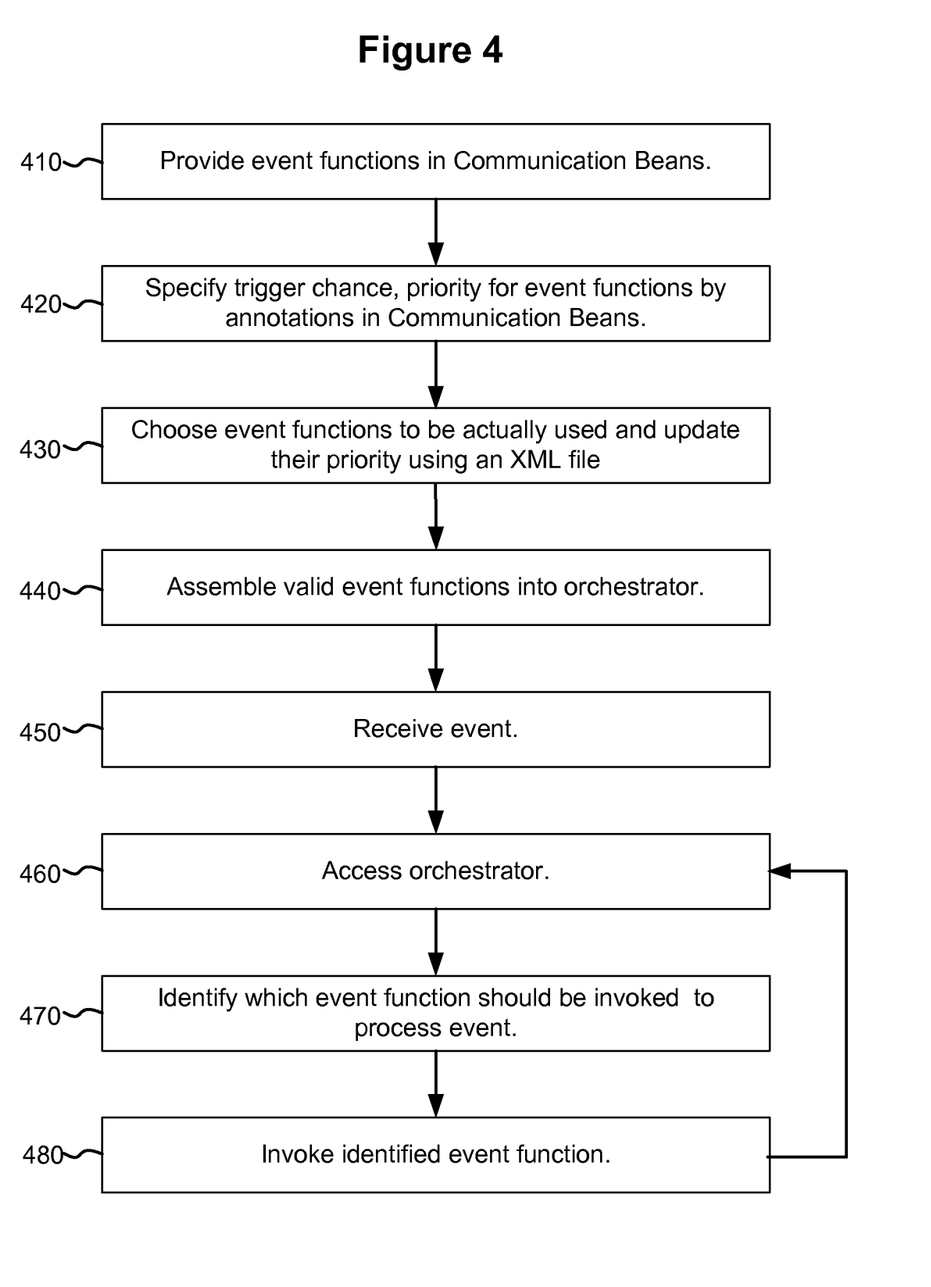
FIG. 4 shows the procedure to apply present invention in a converged application and the work flow at runtime.

FIG. 4 shows the procedure to apply present invention in a converged application and the work flow at runtime. As shown in FIG. 4, a developer provides event functions in Communication Beans in step 410. In step 420 the developer specifies the trigger chances (the event it interests in or it subscribes) and the priority values (lower values are implemented earlier than higher values) for the event functions by annotations in Communication Beans. At step 430, the developer may screen out parts of event functions using an XML file (sft.xml). In this manner, the developer is not required to apply all event functions defined by Communication Beans and annotations in the code. The developer can, using the XML file (sft.xml), selectively apply a subset of the total group of code defined event functions for certain deployment/customer environment. The developer may also modify priority values of the selected event functions using the same XML file to thereby adjust the order in which the selected event functions are invoked. At step 440, when the application framework is initiated, the orchestrator factory reads valid event functions with their trigger chances and priority values (as provided above) and assembles these event functions into an orchestrator.

At runtime framework, the invocation manager receives an event thrown by application framework at step 450. At step 460 the invocation manager accesses the orchestrator to identify the expected event function for handling the event. At step 470, based on the trigger chance and priority, the orchestrator identifies the first or next matched event function and returns it to invocation manager. The invocation manager invokes the identified event function at step 480. Subsequently the invocation manager repeats step 460, accessing the orchestrator to identify the next event function. Steps 460-480 repeat until all event functions interested in a particular event have handled the event.

Although the invention has been described above with respect to communication services in a telecommunications network, the invention also finds application in any situation where it is necessary or desirable to compose components into a single application with a configurable prioritization.

The present invention may be conveniently implemented using one or more conventional general purpose or specialized digital computer, computing device, machine, or microprocessor, and/or network of same, programmed according to the teachings of the present disclosure.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for controlling invocation of event functions in response to an event, the system comprising:
    a converged application server comprising a microprocessor and a memory;
    an application container instance on said converged application server;
    a plurality of event functions defined in a plurality of Communication Beans, said plurality of event functions providing a plurality of different communication functions for processing events, and wherein each of the plurality of event functions subscribes to an event of a plurality of events, and wherein each of the plurality of Communication Beans includes an event function priority annotation comprising a first priority value integer;
    an XML file identifying particular event functions of the plurality of event functions and associated event function priority annotations comprising second priority value integers;
    an orchestrator factory operating in said application container instance, wherein said orchestrator factory is configured such that, upon start-up of the application container instance, the orchestrator factory scans said plurality of Communication Beans and reads said XML file to create an orchestrator in the application container instance for each event of said plurality of events;
    wherein the orchestrator identifies event functions subscribed to a particular event and event function priority annotations comprising an effective priority value integer derived from one of said Communication Bean annotations and said XML file; and
    an invocation manager operating in said container instance, wherein, said invocation manager is configured to
        receive Session Initiation Protocol (SIP) communications over an SIP layer,
        identify occurrence of the particular event from said SIP communications,
        repeatedly call the orchestrator to identify particular event functions of said plurality of event functions to invoke in response to occurrence of said particular event by examining the effective priority value integer associated with the particular event functions in the orchestrator, and
        sequentially invoke the particular event functions identified by the orchestrator,
        thereby invoking each of the particular event functions subscribed to the event in accordance with the effective priority value integers identified in the orchestrator in said single application container instance.

2. The system of claim 1, wherein, when creating said orchestrator the orchestrator factory overwrites one or more first priority value integers derived from said event function priority annotations in said Communication Beans with second priority value integers derived from said event function priority annotations in said XML file when determining the effective priority value integers.

3. The system of claim 1, wherein each first and second priority value integer is a non-negative integer no greater than 100.

4. The system of claim 1, wherein each first and second priority value integer is a non-negative integer no greater than 100 wherein lower values represent earlier priority.

5. The system of claim 1, wherein the invocation manager sequentially invokes the particular event functions in said application container instance thereby reducing communication overhead between said particular event functions.

6. The system of claim 1, wherein the orchestrator identifies a sequence in which to invoke said plurality of event functions using the effective priority value integers.

7. The system of claim 1, wherein wherein the orchestrator identifies a sequence in which to invoke said plurality of event functions using the effective priority value integers wherein event functions associated with lower effective priority value integers are invoked earlier in the sequence.

8. The system of claim 1, wherein each of said plurality of event functions is associated with a rule (trigger chance) which identifies whether to invoke said event function in response to said particular event and wherein the orchestrator applies said rule to determine whether to invoke said event function in response to said particular event.

9. A method for controlling invocation of event functions in response to an event in a converged application server comprising a microprocessor and a memory, the method comprising:
providing an application container instance on said converged application server;
defining a plurality of event functions in a plurality of Communication Beans, said plurality of event functions providing a plurality of different communication functions for processing events, and wherein each of the plurality of event functions subscribes to an event of a plurality of events, and wherein each of the Communication Beans includes an event function priority annotation comprising a first priority value integer;
providing an XML file identifying particular event functions of said plurality of event functions and associated event function priority annotations comprising second priority value integers;
providing an orchestrator factory operating in said application container instance, wherein said orchestrator factory is configured such that, upon start-up of the application container instance, the orchestrator factory scans said plurality of Communication Beans and reads said XML file to create an orchestrator in the application container instance for each event of said plurality of events;
wherein the orchestrator identifies event functions subscribed to a particular event and event function priority annotations comprising an effective priority value integer derived from one of said Communication Bean annotations and said XML file; and
providing an invocation manager operating in said container instance, wherein, said invocation manager,
receives Session Initiation Protocol (SIP) communications over an SIP layer,
identifies occurrence of the particular event from said SIP communications,
repeatedly calls the orchestrator to identify particular event functions of said plurality of event functions to invoke in response to occurrence of said particular event by examining the effective priority value integer associated with the particular event functions in the orchestrator, and
sequentially invokes the particular event functions identified by the orchestrator,
thereby invoking each of the particular event functions subscribed to the event in accordance with the effective priority value integers identified in the orchestrator in said single application container instance.

10. The method of claim 9, further comprising:
using the orchestrator factory to overwrite one or more first priority value integers derived from said event function priority annotations in said Communication Beans with second priority value integers derived from said event function priority annotations in said XML file when determining the effective priority value integers.

11. The method of claim 9, wherein each first and second priority value integer is a non-negative integer no greater than 100.

12. The method of claim 9, wherein each first and second priority value integer is a non-negative integer no greater than 100 wherein lower values represent earlier priority.

13. The method of claim 9, further comprising:
sequentially invoking the particular event functions with the invocation manager in said application container instance thereby reducing communication overhead between said particular event functions.

14. The method of claim 9,
wherein the orchestrator identifies a sequence in which to invoke said plurality of event functions using the effective priority value integers.

15. The method of claim 9,
wherein the orchestrator identifies a sequence in which to invoke said plurality of event functions using the effective priority value integers wherein event functions associated with lower effective priority value integers are invoked earlier in the sequence.

16. The method of claim 9, further comprising:
associating each of said plurality of event functions with a rule (trigger chance) which identifies whether to invoke said event function in response to said particular event and wherein the orchestrator applies said rule to determine whether to invoke said event function in response to said particular event.

17. A non-transitory computer readable medium including instructions stored thereon for controlling invocation of event functions in response to an event in a converged application server, which instructions, when executed, cause the converged application server to perform steps comprising:
providing an application container instance on said converged application server;
defining a plurality of event functions in a plurality of Communication Beans, said plurality of event functions providing a plurality of different communication functions for processing events, and wherein each of the plurality of event functions subscribes to an event of a plurality of events, and wherein each of the Communication Beans includes an event function priority annotation comprising a first priority value integer;
providing an XML file identifying particular event functions of said plurality of event functions and associated event function priority annotations comprising second priority value integers;
providing an orchestrator factory operating in said application container instance, wherein said orchestrator factory is configured such that, upon start-up of the application container instance, the orchestrator factory scans said plurality of Communication Beans and reads said XML file to create an orchestrator in the application container instance for each event of said plurality of events;
wherein the orchestrator identifies event functions subscribed to a particular event and event function priority annotations comprising an effective priority value integer derived from one of said Communication Bean annotations and said XML file; and
providing an invocation manager operating in said container instance, wherein, said invocation manager,
  receives Session Initiation Protocol (SIP) communications over an SIP layer,
  identifies occurrence of the particular event from said SIP communications,
  repeatedly calls the orchestrator to identify particular event functions of said plurality of event functions to invoke in response to occurrence of said particular event by examining the effective priority value integer associated with the particular event functions in the orchestrator, and
  sequentially invokes the particular event functions identified by the orchestrator,
  thereby invoking each of the particular event functions subscribed to the event in accordance with the effective priority value integers identified in the orchestrator in said single application container instance.

18. The non-transitory computer readable medium of claim 17 including further instructions stored thereon which when executed cause a converged application server to perform further steps comprising:
using the orchestrator factory to overwrite one or more first priority value integers derived from said event function priority annotations in said Communication Beans with second priority value integers derived from said event function priority annotations in said XML file when determining the effective priority value integers.

19. The non-transitory computer readable medium of claim 17 wherein each first and second priority value integer is a non-negative integer no greater than 100.

20. The non-transitory computer readable medium of claim 17 wherein each first and second priority value integer is a non-negative integer no greater than 100 wherein lower values represent earlier priority.

* * * * *

UNITED STATES PATENT AND TRADEMARK OFFICE
CERTIFICATE OF CORRECTION

PATENT NO. : 9,672,011 B2
APPLICATION NO. : 13/671416
DATED : June 6, 2017
INVENTOR(S) : Gangadharan et al.

It is certified that error appears in the above-identified patent and that said Letters Patent is hereby corrected as shown below:

On the Title Page

In the illustrative figure, Reference Numeral 430, Line 2, after "file" insert -- . --.

In the Drawings

On sheet 3 of 3, in Figure 4, under Reference Numeral 430, Line 2, after "file" insert -- . --.

In the Claims

In Column 11, Line 23, in Claim 7, delete "wherein wherein" and insert -- wherein --, therefor.

Signed and Sealed this
Sixth Day of March, 2018

Andrei Iancu
*Director of the United States Patent and Trademark Office*